J. H. & T. K. BARLEY.

HARROW TOOTH FASTENING.

No. 10,129. Reissued June 6, 1882.

Witnesses.
William W. Mortimer.
W. H. Kerr.

Inventors
Jas. H. Barley,
T. K. Barley,
per
T. A. Lehmann,
Atty.

N. PETERS, Photo-Lithographer, Washington, D. C.

UNITED STATES PATENT OFFICE.

JAMES H. BARLEY AND THOMAS K. BARLEY, OF SEDALIA, MISSOURI.

HARROW-TEETH FASTENING.

SPECIFICATION forming part of Reissued Letters Patent No. 10,129, dated June 6, 1882.

Original No. 205,520, dated July 2, 1878. Application for reissue filed October 31, 1881.

*To all whom it may concern:*

Be it known that we, JAMES H. BARLEY and THOMAS K. BARLEY, of Sedalia, in the county of Pettis and State of Missouri, have invented certain new and useful Improvements in Harrow-Teeth Fastenings; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

Our invention relates to an improvement in harrow-teeth fasteners; and it consists, first, in the combination of the beam, the plate provided with means on its outer side to regulate the movement of the adjustable tooth, a clamping screw-bolt which passes through both plate and beam, and a harrow-tooth, the outer end of the bolt being formed into an eye or loop through which the tooth passes, and which serves as a pivot in which the tooth turns; second, in the combination of the beam, the plate provided with projections on its inner side for catching in the side of the beam, and a clamping screw-bolt which passes through both plate and beam and serves as a pivot for the tooth to turn on, the plate being provided with plates or shoulders to allow the plate to reverse from a vertical to a slanting position; third, in the combination of a harrow-tooth, the beam, a plate having projections on its inner side to catch in the side of the beam, and having stops formed on its outer side to regulate the movement of the tooth, and a pivotal clamping-bolt which has an eye formed on its outer end through which the tooth passes, and which bolt holds the plate and tooth against the side of the beam; fourth, in the arrangement and combination of parts, which will be more fully described hereinafter.

The object of our invention is to provide a means for attaching the harrow-teeth to the sides of the bars or beams of the harrow in such a manner that the teeth will stand vertically when the harrow is drawn from one end and in an inclined position when drawn from the opposite end.

Figure 1:
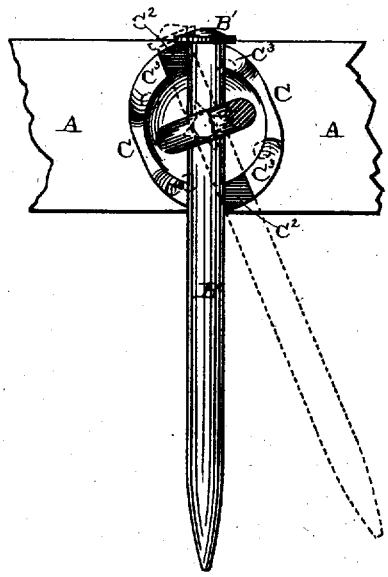
Figure 2:
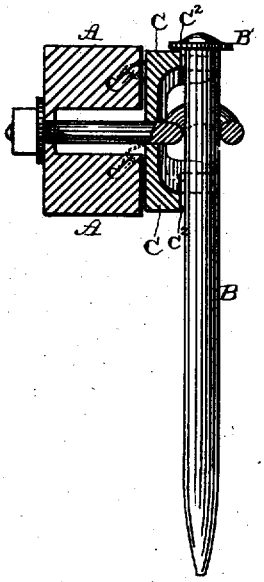
Figure 3:
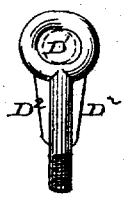

Figure 1 is a face view of our improved fastenings, shown as securing a harrow-tooth to the side of a bar of the frame. Fig. 2 is a section of the same, taken through the line *x x* of Fig. 1. Fig. 3 is a detail side view of the bolt.

A represents one of the bars or beams of a harrow-frame, which is constructed in the usual manner. Placed against the side of the bar or beam A is the holder-plate C, which has a number of prongs, projections, or lugs, C′, formed upon one of its sides for the purpose of catching in corresponding recesses made in the side of the beam A, and thus rigidly holding the plate in the position into which it was adjusted when first attached to the beam. These projections serve to prevent the plate from turning around upon a pivotal bolt, as it otherwise would do, whenever the strain was brought to bear upon its tooth. Upon one side of these holder-plates C are formed the stops $C^3$, and in between the shoulders are formed the bearing-surfaces $C^2$, for the harrow-tooth B to rest against when in a working position. The distance between these stops is preferably made of such a length as to allow the tooth to move back and forth between a vertical position, as shown in solid lines in Fig. 1, and an angle of from thirty to forty-five degrees, as shown in dotted lines.

The harrow-tooth B is made of round steel rods tapered to a point at one end, and which have button-shaped heads B′ formed upon their other ends, the lower sides of the said heads being at right angles to the length of the teeth. These heads catch over the tops of the holder-plate C, and thus prevent the teeth from becoming displaced.

When the harrow is drawn from one end the frictional contact of the lower end of the teeth against the ground causes the teeth to assume the vertical position shown in solid lines in Fig. 1, and when the harrow is drawn from the opposite end the tooth automatically reverses to an inclined position. (Shown in dotted lines.) This tooth B is held in position by means of the bolt which passes through the beam A, and which has an elongated eye, D′, formed upon one end, and a screw-thread formed upon its other end to receive a holding-nut. By tightening up this nut the bolt may be tightened to any desired degree of force against the side of the plate C. By making the eye D′ elongated, as shown, the tooth can move freely back and forth, as shown in Fig. 1. In order to prevent this bolt from turning in the beam, it has wings $D^2$ formed upon its opposite sides, which wings pass through notches in the plates C, and catch in suitable recesses which are made through them in the beam A. These wings prevent the bolt from being turned around, and thus the bolt always stands at the angle at which it is adjusted when the plate and tooth are clamped in position.

By means of this construction by loosening the bolt and turning the holder-plate C one-quarter around the teeth B may be turned up to a horizontal position parallel with the bars A, for convenience in transportation.

We are aware that harrow-teeth have been secured to harrow-beams by means of a metal casting, the upper portion of the casting having a flange, which projects over the edge of the beam, and through the lower horizontal portion of said casting are formed holes, through which the harrow-tooth is passed. By this arrangement each tooth will require adjusting by hand separately from one position to the other, thus requiring a great deal of time and labor, and this we disclaim.

Having thus described our invention, we claim—

1. The combination of the beam A, the plate C, provided with means on its outer side to regulate the movement of the adjustable tooth, a clamping screw-bolt which passes through both plate and beam, and a harrow-tooth, the outer end of the bolt being formed into an eye or loop through which the tooth passes, and which serves as a pivot in which the tooth turns, and to clamp both tooth and plate against the side of the beam, substantially as shown.

2. The combination of the beam A, the plate C, provided with the projections C′ for catching in recesses in the side of the beam, and a clamping screw-bolt, which passes through both plate and beam, and serves as a pivot for the tooth to turn on, the plate being provided with stops or shoulders to allow the tooth to reverse from a vertical to a slanting position, substantially as described.

3. The combination of a harrow-tooth, the beam A, the plate C, provided with projections or lugs C′ for catching in the recesses in the beam, and having the stops $C^3$, formed on its outer side to allow the tooth to be used in either a vertical or a slanting position, and a pivotal clamping-bolt with its outer end formed into an eye or loop through which the tooth passes, and which bolt holds the tooth and plate against the side of the beam, substantially as specified.

4. The combination of the beam A, the plate C, provided with the projections C′ and the stops $C^3$, the harrow-tooth B, and the pivotal clamping-bolt provided with the wings $D^2$, substantially as specified.

5. The holder-plate C, made with the projections C′ upon one of its sides, and provided with the stops $C^3$ and the bearing-surfaces $C^2$, the clamping-bolt made with elongated eye D′, and the wings $D^2$ upon opposite sides, in combination with the tooth B and the bar A, all arranged to operate substantially as shown.

In testimony whereof we affix our signatures in presence of two witnesses.

JAMES H. BARLEY.
THOMS. K. BARLEY.

Witnesses:
JNO. D. CRAWFORD,
R. I. HATTON.